United States Patent [19]

Justice

[11] 3,725,571

[45] Apr. 3, 1973

[54] MULTIPLEX VIDEO TRANSMISSION SYSTEM

[75] Inventor: James W. H. Justice, Murrysville, Pa.

[73] Assignee: Westinghouse Electric Corporation, Pittsburgh, Pa.

[22] Filed: June 21, 1971

[21] Appl. No.: 155,078

[52] U.S. Cl. ........178/5.2 R, 178/DIG. 23, 178/5.4 R

[51] Int. Cl. ............................H04n 9/00, H04n 7/08

[58] Field of Search..............178/5.6, 5.8, 6, 6.8, 7.1, 178/7.2, DIG. 3, DIG. 23, 5.2 R, 5.4 R, 6.5

[56] References Cited

UNITED STATES PATENTS

| | | | |
|---|---|---|---|
| 3,358,079 | 12/1967 | Banning, Jr. | 178/6.5 |
| 3,401,299 | 9/1968 | Crowell | 178/DIG. 3 |
| 3,484,544 | 12/1969 | Walker | 178/5.1 |
| 3,488,435 | 1/1970 | Eilenberger | 178/5.6 X |
| 3,562,421 | 2/1971 | Moskovitz | 178/6.8 |
| 3,660,599 | 5/1972 | Wiedmann | 178/DIG. 23 |

*Primary Examiner*—Robert L. Richardson
*Attorney*—F. H. Henson et al.

[57] ABSTRACT

System of receiving a plurality of n-separate pictures wherein every nth line of each of the pictures is selected for transmission beginning at a different line and wherein reception of the selected one of the pictures is accomplished by selecting from the plurality of lines transmitted every nth line commencing at the preselected line, with the selected line being delayed by a medium having a bandwidth less than the bandwidth of the video pictures and recombined with the undelayed selected line so that the selected one of the pictures may be displayed with high-quality resolution.

5 Claims, 7 Drawing Figures

MULTIPLEX VIDEO TRANSMISSION SYSTEM

BACKGROUND OF THE INVENTION

1. Field of the Invention

The present invention relates to the reception of a plurality of video pictures and, more particularly, to the reception of a plurality of video pictures of high-quality on a line sharing basis wherein a unique delay system is embodied.

2. Description of the Prior Art

In copending application Ser. No. 135,713, filed Apr. 20, 1971, and assigned to the same assignee as the present application, a system is disclosed wherein a plurality of separate television pictures may be transmitted over a single television channel on a line sharing basis. A selected one of the plurality of pictures may be displayed by selecting the lines corresponding to the desired picture. For example, if two separate pictures are transmitted, the odd lines of each field would be selected for the first picture and the even lines of each field would be selected for the second picture for transmission. For the receiver to display the first picture, the odd lines would be selected and to display the second picture the even lines would be selected. In copending application Ser. No. 143,775, filed May 17, 1971, and assigned to the same assignee as the present application, a receiving system is disclosed for improving the line resolution of the received line shared video picture. Improved resolution is accomplished by delaying the selected line by substantially one horizontal line time period and recombining it with the undelayed selected line so that a complete picture is provided for reproduction consisting of undelayed line followed by a corresponding delayed line and then the next selected undelayed line followed by a corresponding delayed line, etc. In the just described system wherein it is necessary to delay a selected line for substantially one horizontal line, it is necessary to provide a delay line capable of introducing the necessary delay, which according to U.S. standards, is approximately 63.5 $\mu$ seconds, and having a sufficient bandwidth to accommodate the video intelligence present in the selected line. The bandwidth requirement for delaying video information is severe. For example, according to NTSC color television standards as employed in the United States a bandwidth of approximately 4 MHz is required for the luminance signal Y extending from DC to approximately 4 MHz, with the chrominance (chroma) color signal being modulated onto a 3.6 MHz subcarrier. In order to provide a delay time of approximately one horizontal line (63.5 $\mu$ seconds), it is necessary to employ a glass or quartz delay line such delay lines typically have a bandwidth of approximately 8 MHz, with the bandwidth centered at approximately 25 MHz. In using such a delay line it is necessary that the video signal be double sideband modulated onto a carrier of approximately 25 MHz and then applied to a bandpass filter having a similar bandpass characteristic to the delay line (i.e., having a center frequency of approximately 25 MHz and extending 4 MHz above and below the center frequency). The signal is then applied to the quartz or glass delay line, amplified and then must be demodulated to its original form. The demodulated delayed signal is then applied to a low pass filter to eliminate the 25 MHz carrier signal from the video output. Such wide band width delay lines are quite expensive and would be in the order of twenty times as expensive as the delay line as employed in the present delay system.

SUMMARY OF THE INVENTION

Broadly the present invention provides a system wherein a plurality of video pictures transmitted on a line sharing basis may be reproduced by selecting lines from a plurality of lines transmitted, delaying the selected lines with a delay system having a bandwidth substantially less than the bandwidth of video pictures and combining them with the undelayed selected lines to provide a high-quality representation of the selected picture.

DESCRIPTION OF THE PREFERRED EMBODIMENTS

Figure 1:
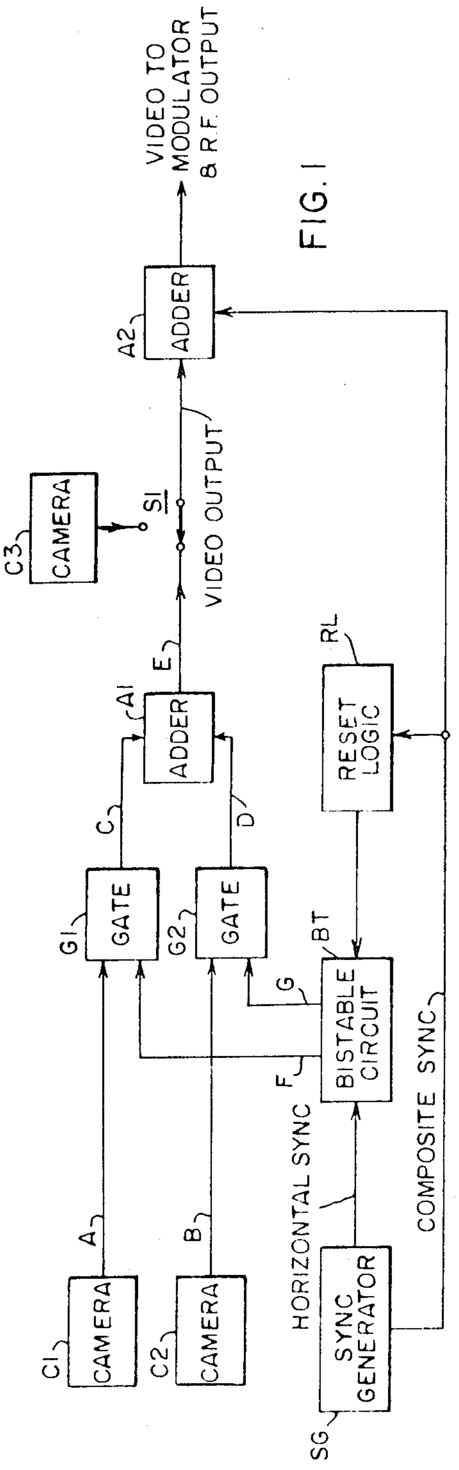
FIG. 1 is a block diagram of a transmitting system employable in the present invention.
Figure 2:
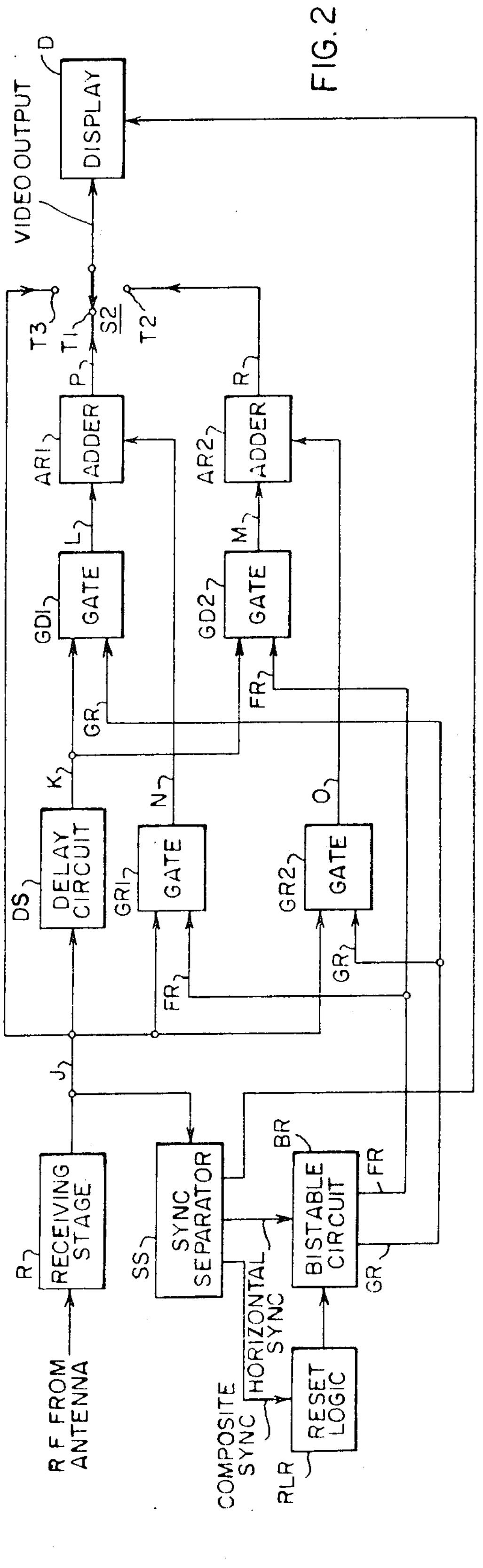
FIG. 2 is a block diagram of a receiving system employing the delay system of the present invention in block form.

FIG. 1 shows a transmitter according to the line sharing principle as disclosed in the copending application Ser. No. 135,713, filed Apr. 20, 1971, indicated above. FIG. 2 shows a receiver as disclosed in copending application Ser. No. 143,775, filed May 17, 1971, including a delay system DS shown in block form to be described below. In the transmitter of FIG. 1, a first camera C1 and a second camera C2 are employed for respectively scanning a separate scene. The camera C1 and C2 may comprise state-of-the-art monochrome or color television cameras which operate according to U.S. standards wherein two fields are interlaced to provide a complete frame of video information. A complete frame comprises 525 horizontal lines of two interlaced fields.

Both cameras C1 and C2 scan their respective scenes line by line through the two fields to comprise a complete interlaced frame upon reproduction. The video output A of the camera C1 is shown in curve A of FIG. 3 and is illustrated on a line by line basis during the first six lines of field No. 1. The output B of the camera C2 is illustrated in curve B of FIG. 3. The outputs A and B of the camera C1 and C2 are respectively applied to gates G1 and G2. The gates G1 and G2 respectively have gating signals F and G applied thereto supplied by a bistable circuit BT. A sync generator SC supplies horizontal sync pulses to the bistable circuit BT, which causes the bistable circuit BT alternately to provide outputs F and G as shown respectively on curves F and G of FIG. 3 during alternate lines. The composite sync output of the synchronizing generator SG is applied to a reset logic circuit RL, which supplies a reset output to the bistable circuit BT at the beginning of each frame of video information. That is, the bistable circuit BT is reset after two fields of scan are completed which would contain 525 lines.

The gate G1 is rendered conductive by the input F thereto during the odd lines of each of the fields, that is, during the lines 1, 3, 5 . . . 525, so that these odd lines from output A of camera C1 are translated therethrough. The gate G2 is rendered conductive by the input G from the bistable circuit BT during the time intervals when the even lines of each of the fields are supplied to the gate from the camera C2. Thus lines 2, 4, 6 . . . 524 will be translated by the gate G2 from the output B of the camera C2. The output C of the gate G1 is shown in curve C of FIG. 3, and the output D of the gate G2 is shown in curve D of FIG. 3.

The odd lines of the output A of the camera C1 and the even lines of the video output B of camera C2 are supplied to an adder A1. The output of adder A1 is the sum signal E which is equal to C+D. This is applied via the switch S1 to an output adder A2 wherein the composite sync signal from the sync generator SG is combined with the video output E. The composite video output of the adder A2 is then applied to a modulator to modulate a carrier for the RF transmission of the video information on the carrier by well known techniques. If desired, of course, cable transmission could be employed. The transmission would be upon a single channel and would be at full bandwidth with alternate lines of the outputs A and B of the cameras C1 and C2 being transmitted in that order such as shown in curve E in FIG. 3.

A third camera C3 is provided and through the switch S1 may be connected to the adder A2 while disconnecting the cameras C1 and C2 therefrom. The camera C3 would transmit in a normal line by line fashion according to standard practice.

The transmitted video information includes alternate lines from the picture scanned by the cameras C1 and C2. Either picture could thus be reconstructed by selecting at the receiver the odd lines from the composite received for the first picture A or the even lines for the second picture B.

Figure 3:
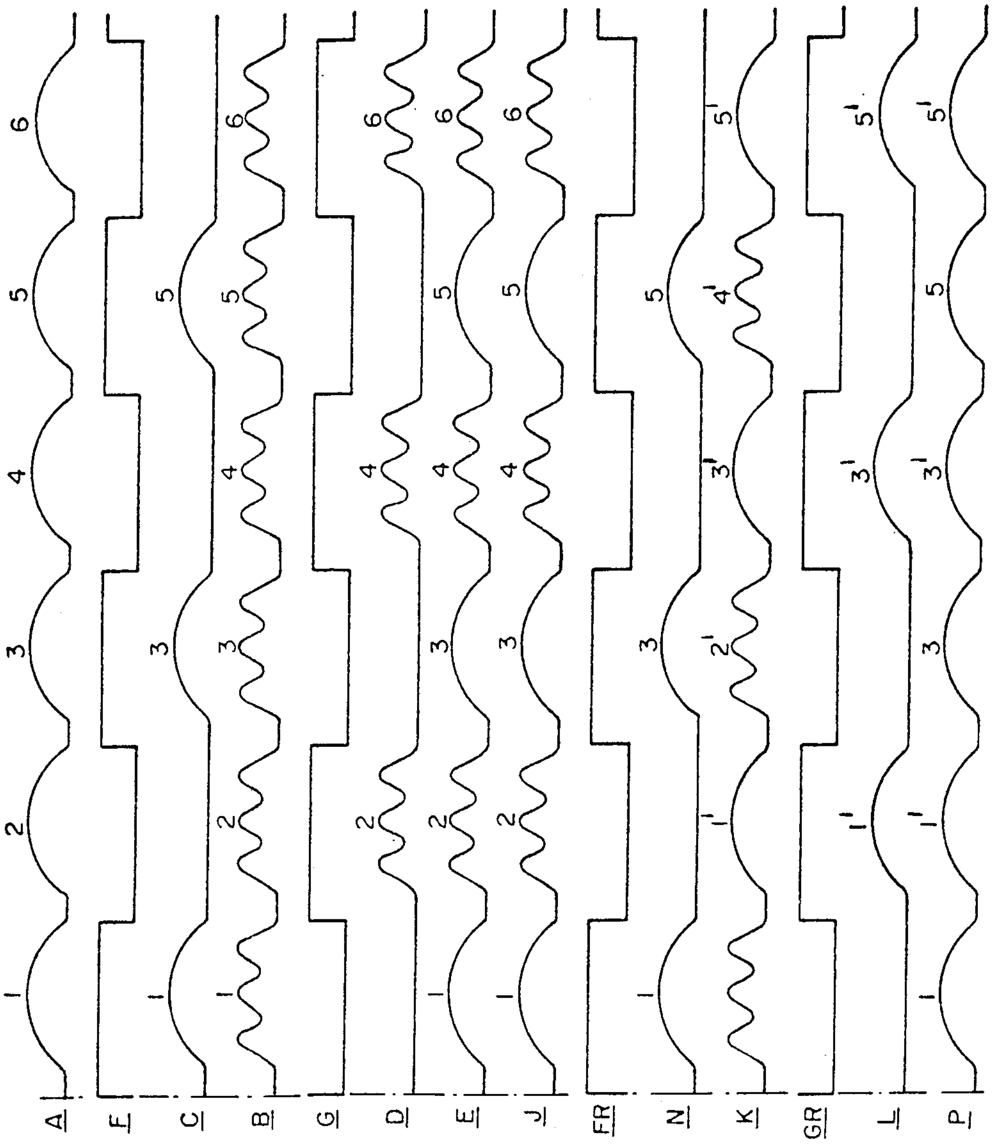
FIG. 3 is a waveform diagram including a plurality of curves employed in the explanation of the present system.

Referring to FIG. 2 the transmitted video signals from the transmitter of FIG. 1 are received in a receiving stage R of the receiver including radio frequency, intermediate frequency and detecting circuits, as well known in the art, so that the output J thereof comprises a video signal J such as shown in curve J of FIG. 3 which corresponds to curve E of FIG. 3 at the transmitter. For simplicity of representation the waveform of curve J does not include the synchronizing information in the output of the receiving stage R. The composite signal J is applied to a sync separator SS which provides a composite sync output as one output thereof and horizontal sync pulses at another output thereto to a bistable circuit BR. The bistable BR is operative to provide alternately outputs FR and GR as shown in curves FR and GR of FIG. 3 at the line rate. A reset logic circuit RLR has applied thereto the composite sync output of the sync separator SS and provides a reset output at the frame rate, that is, one-half the field rate to reset the bistable circuit BR at the beginning of each frame.

The video output J (including the odd lines from the first picture and the even lines from the second picture) is applied to the delay system DS, a gate GR1 and a gate GR2. The gate GR1 has applied thereto the gating pulse FR and the gate GR2 has applied thereto the gating GR. Thus, the gate GR1 is rendered conductive during the times that the odd lines appear in the video signal J and supplies an output N consisting of the odd lines as illustrated in curve N of FIG. 3. The gate GR2 is responsive to the pulses GR and is rendered conductive during the presence of the even lines to supply an output O consisting of the even lines.

The delay system DS is selected to have a delay time equal to approximately one horizontal line of scan, that is, approximately 63.5 $\mu$ seconds at a horizontal scanning rate of 15,750 Hz, for example. The delay system is fully described below with reference to FIGS. 5, 6 and 7.

The output K of the delay system DS thus corresponds to the video input J thereto, however, delayed by one horizontal line. The output K is shown in curve K of FIG. 4 with the prime designations (1′, 2′, 3′ . . . ) being indicative of the fact that the numbered line has been delayed by one line time. Accordingly, the delayed line 1′ as shown in curve K will appear at a time one horizontal line period later than the line 1 as it appears in waveform N of FIG. 4.

The delayed waveform K is applied to a pair of gates GD1 and GD2. The gate GD1 has applied thereto the switching waveform GR which causes this gate to be rendered conductive during the time that the odd delayed lines appear at the input thereto so that the output L as shown in curve L of FIG. 3 includes the odd delayed lines 1′, 3′, 5′. The output L is applied to an adder AR1 to be added to the output N of the gate GR1 which comprises the undelayed odd lines 1, 3, 5. The composite output P of the adder AR1 is thus N+L which is illustrated in curve P of FIG. 3. The waveform P includes the undelayed line 1 followed by the delayed line 1′, the undelayed line 3 followed by the delayed line 3′, etc. The delayed lines 1′, 3′, 5 are substantially identical to their undelayed line counterparts.

The composite output P of the adder AR1 is applied to a switch S2 which includes three fixed terminal positions T1, T2 and T3. As shown in FIG. 2, the switch S2 is connected to the T1 terminal position. Thus the output P is applied to a display D which may comprise a standard cathode ray tube monitor. The vertical and horizontal synchronizing output of the sync separator SS would be applied to the display D to control the scanning operation thereof.

The gate GD2 has the waveform FR applied thereto so that the gate GR2 is rendered conductive during the times that the delayed even lines of the waveform K are present so that the output of the gate GD2 is a waveform M which includes only the even delayed lines 2′, 4′, 6′. The output M is applied to an adder AR2 which also receives the output O of the gate GR2. The composite output of the adder AR2 is an output R which constitutes an undelayed even line followed by a delayed line, e.g., 2, 2′, 4, 4′, 6 6′. The output R is applied to the terminal T2 of the switch S2 so that by switching the switch S2 to the T2 position the even undelayed and delayed lines may be applied to the display D.

Figure 4:
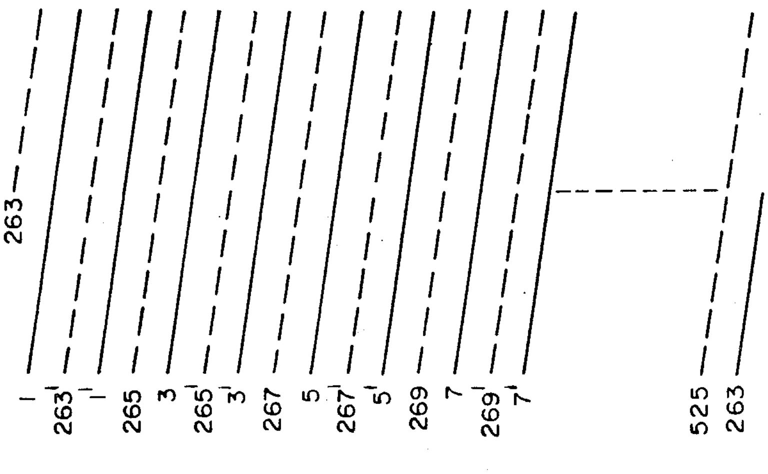
FIG. 4 is a pictorial diagram used in explaining the operation of the present system.

As shown in FIG. 4, the first picture scanned by camera C1 may thus be displayed at full line resolution with a 525 line frame with the odd lines and selected following a field sequence 1, 1', 3, 3', 5, 5' . . . 523, 523', 525, and interlaced in a complete frame as would occur in a standard television format. In FIG. 4, the lines of the first field are shown in solid lines and the lines of the second field are shown dashed.

If it were desired to display the B picture output B of the camera C2 the switch S2 would be switched to the T2 terminal. This would permit the B picture information to be displayed as included in the even lines as selected for transmission by the transmitter of FIG. 1. Thus a complete frame of 525 lines comprising the even lines followed by the same even delayed line would be displayed in substantially the identical manner as for the odd lines.

If the camera C3 were being used for transmission through the transmitter of FIG. 1, the switch S2 would be connected to the terminal T3 which would then provide the display in response to the output of the camera C3 as would be the case in normal television transmission. In a television system employed for teaching purposes the output of camera C3 could be employed for explanatory purposes or for normal programming as desired.

The respective outputs A and B of the cameras C1 and C2 are separate and could be directed to the same subject matter at different intelligence levels, to different subject matter or to any teaching programming which adapts itself to television usage. At the receiver students in the same location or different locations within the broadcast range of the transmitter of FIG. 1 could receive either the A or B program as desired. It should also be understood that only two cameras C1 and C2 employed on line sharing basis have been shown for the purposes of simplicity. Three or more camera setup could be employed such as the three picture system as shown in copending application Ser. No. 135,713.

Figure 5:
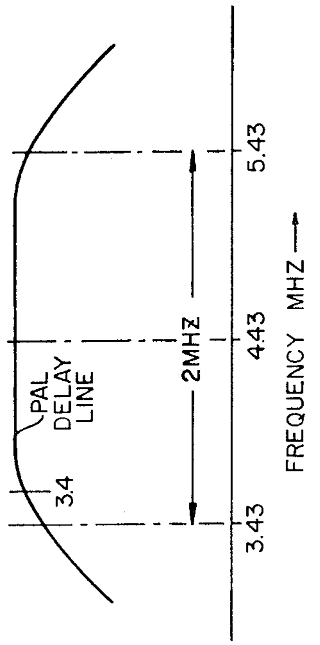
FIG. 5 is a diagram of the bandwidth characteristics of the delay line as employed in the present invention.

FIG. 5 shows the bandwidth characteristics of the delay line employed in the delay system DS of the present invention.

The delay line is one which is current mass produced for use in the European Phase Alternation Line (PAL) color television system and thus is relatively inexpensive. The delay line has a delay of approximately 63.5 $\mu$ seconds as required in the present system and has a bandpass centered about 4.43 MHz with a total bandpass of approximately 2 MHz as illustrated in FIG. 5.

Figure 6:
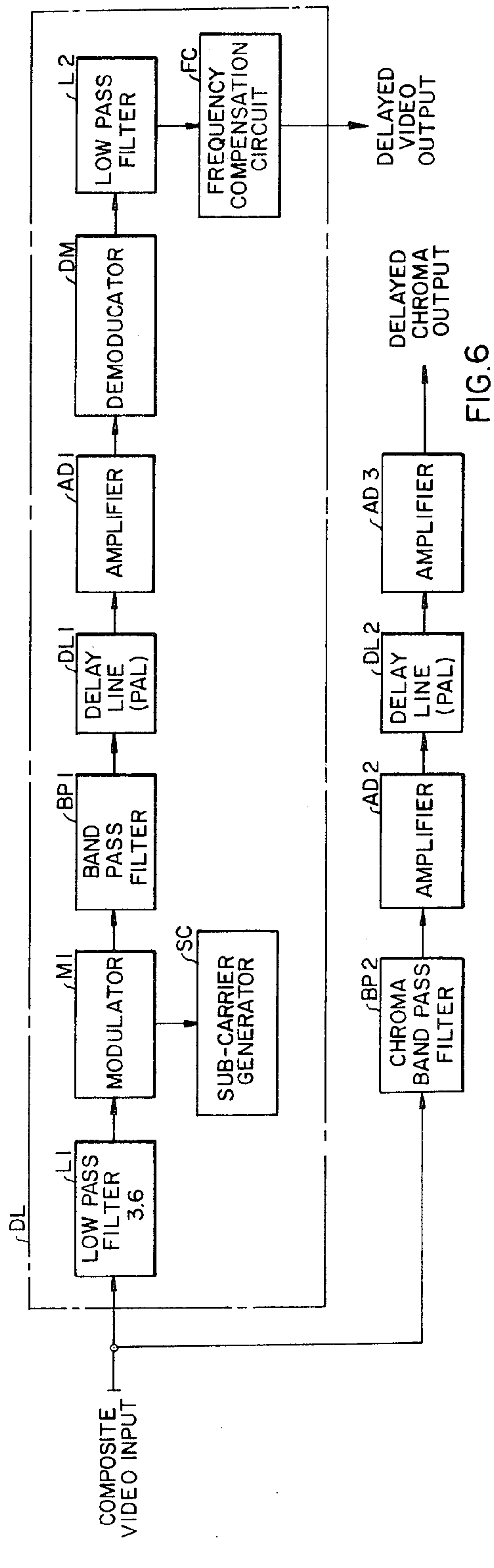
FIG. 6 is a block diagram of the delay system of the present invention.

In FIG. 6 the delay system of the present invention is shown in block form corresponding to that which would be included within the block DS of FIG. 2. For the purposes of explanation it will be assumed that a color broadcast is being received and that the receiver is a color receiver. The composite video signal J is applied to a low pass filter L1 which has a filter trap with a very high rejection at 3.6 MHz to remove the chorminance (chroma) signal present in the composite video signal. The output of the low pass filter L1 is applied to a modulator M1. A carrier signal at approximately 3.6 MHz is applied to the modulator M1 so that it is modulated in response to the output of the low pass filter L. It should be noted from FIG. 5 that the subcarrier frequency 3.6 MHz falls within the bandpass of the PAL delay line characteristic. The subcarrier generator is already present within a color television receiver for demodulation of the chroma signal from the composite color television signal. The output of the modulator M1 is applied to a bandpass filter BP1 which has response characteristic similar to that of the delay line.

The bandpass limited output of the filter BP1 is supplied to a delay line DL1 which comprises a PAL delay line having a delay of approximately 63.5 $\mu$ seconds and a frequency response characteristic as shown in FIG. 5. Since the subcarrier frequency of 3.6 MHz is very near the low frequency cutoff of the PAL delay line, residual sideband operation will be effected with substantially all of the lower sideband of the modulation being eliminated. The upper sideband, however, would be delayed and translated through the delay line DL1 and would have a video bandwidth of somewhat in excess of 2 MHz. Alternately, the subcarrier could be selected near the upper end of the bandpass characteristic, e.g., 5.3 MHz and the lower sideband would be delayed and translated.

The output of the PAL delay line DL1 is applied to an amplifier AD1 to bring it to a useful level for demodulation in a demodulator DM wherein the signal is demodulated to video form. The demodulated video is than applied to a low pass filter L2 which has a trap at 3.6 MHz to remove the subcarrier. The video signal is then applied to a frequency compensation circuit FC for shaping the video signal for optimal overall video response. The output of the circuit FB is then the delayed video output which corresponds to the output K of FIGS. 2 and 3.

It should be noted if only a monochrome signal has been transmitted the portion DL enclosed within the dashed block of the system so far described in FIG. 6 would be all that would be used for the delay of the signal.

With the assumption that a color transmission is being received, it is also necessary the the chrominance portion of the composite video signal also be delayed by the 63.5 $\mu$ second delay. This is accomplished in FIG. 6 by applying the composite video input to a chroma band pass filter BP2 which has a bandpass sufficient to translate the chominance signal modulated upon the 3.6 MHz subcarrier. The output of the filter BP2 is amplified in amplifier AD2 and then applied to a second PAL delay line DL2 wherein the chrominance signal is delayed by the required 63.5 seconds. The output of the delay line DL2 is amplified in amplifier AD3 which supplies the delayed chroma output of the receiver. The delayed chrominance signal output may be further amplified and then applied to the standard color demodulator present in the receiver along with the undelayed chrominance signals to provide the complete line resolution display as discussed above.

Figure 7:
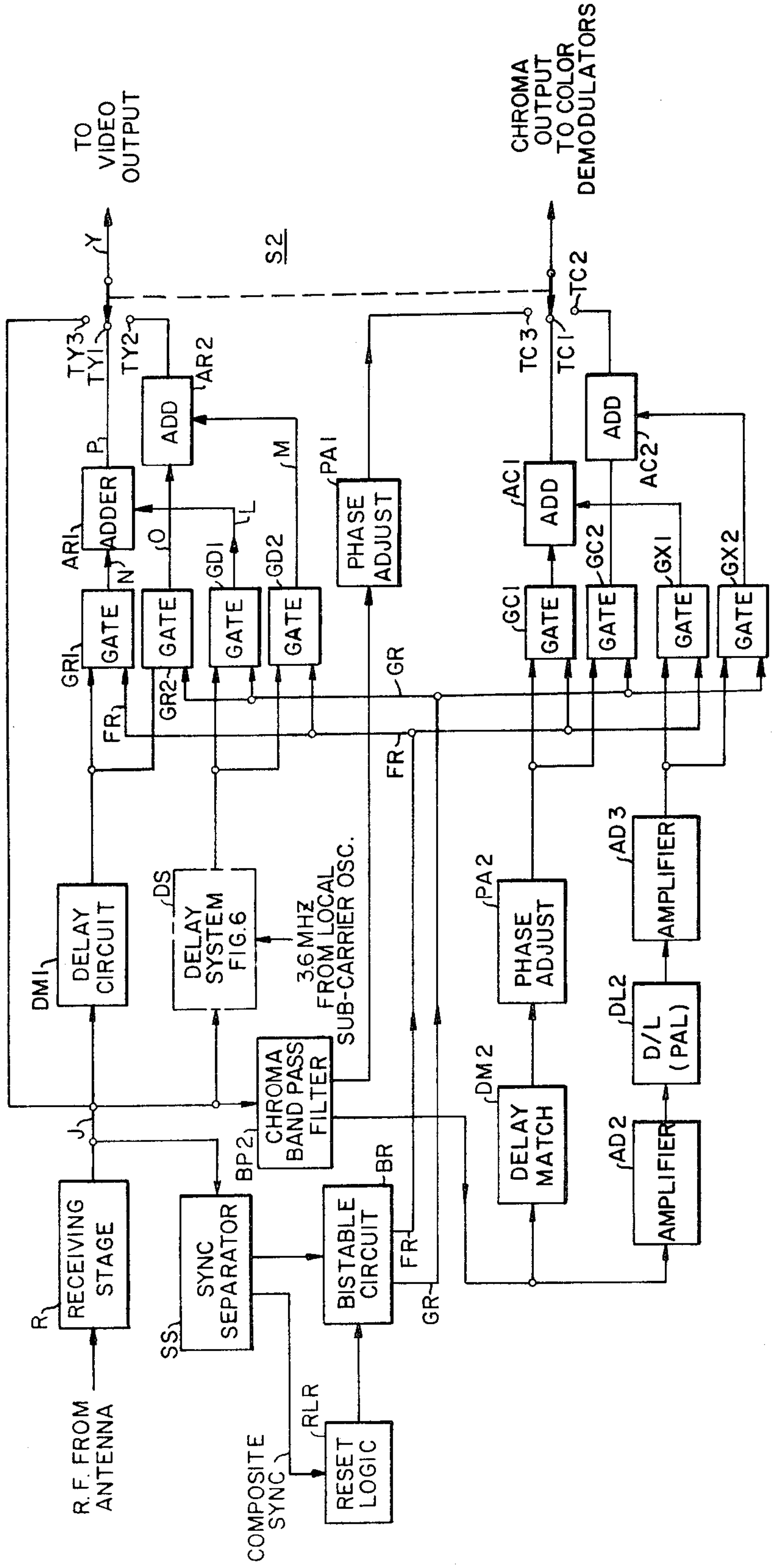
FIG. 7 is a complete block diagram of the receiver of the present invention incorporating the delay system as taught herein.

FIG. 7 shows the complete receiver system with the PAL delay line system incorporated therein. In FIG. 7 the same reference characters have been employed as in FIGS. 2 and 6. The color receiver system of FIG. 7 operates in the same manner as the receiver of FIG. 2 and the delay system of FIG. 6 as described above.

In FIG. 7 a matching delay circuit DM1 is inserted in the undelayed luminance path between the receiving stage R and the gate GR1 in order to equalize the delays in the undelayed path with the delayed path including the luminance delay portion DL within the dashed block. Also a matching delay DM2 is inserted in the undelayed chrominance path between the chroma bandpass filter BP2 and a phase adjust circuit PA2 in order to equalize the delay and adjust the relative phases of the signals in the undelayed and delayed chroma paths. In order to prevent a change of hue in the picture when switching from line sharing operation to normal operation, it is necessary to match the color phases of the different signal paths. A phase adjust circuit PA1 is included between the chroma bandpass filter BP2 and the terminal TC3 of the switch S2 to insure proper phase when the camera C3 is being used for transmission purposes as discussed above with reference to FIG. 1.

The switch S2 as shown in FIG. 8 is a ganged switch having a Y section including terminals TY1, TY2 and TY3, with the Y luminance output being provided thereby. Thus, luminance information corresponding to the video outputs of cameras C1, C2 and C3 may be respectively outputted from the terminals TY1, TY2 and TY3. The chroma section of the switch S2 includes terminals TC1, TC2 and TC3 with the corresponding chroma outputs for the video outputs of cameras C1, C2 and C3 being provided respectively therefrom. The luminance from the switch S2 output Y would be applied to luminance amplifying circuitry and then to the cathode of a color picture tube as is well known in the art. The chroma output from the switch S2 would be applied to color demodulating circuitry which in standard U.S. practice supplies a color difference output to the respective grids of a color picture tube.

The resulting display of the color receiver of FIG. 7 when either the switch S2 in the TY1–TC1 or TY2–TC2 positions is a line shared color display having full line display and providing a high quality picture output. By connecting switch S2 to the TY3–TC3 position, normal color reproduction will result. A user at the receiver can select any of the incoming broadcasts as desired which would be ideally adaptable for use in a teaching environment.

I claim as my invention:

1. A method of receiving a plurality of n-separate color video pictures including luminance and chrominance portions in the form of a plurality of lines including the nth lines of each of said pictures commencing from a different preselected line at each of said plurality of pictures, comprising the steps of:
- selecting the nth line from said plurality of lines commencing at a preselected line so that these lines are selected from one of said plurality of color video pictures;
- said color video pictures including luminance and chrominance portions;
- delaying said luminance and chrominance portions of said selected lines for substantially $n-1$ line time periods, said luminance portion being delayed by a medium having a bandwidth less than the bandwidth of said luminance portion;
- combining said selected lines which are delayed with those which are undelayed; and
- displaying said selected and combined lines so that an undelayed line is followed by a corresponding delayed line.

2. In a system for receiving a plurality of n-separate video pictures in the form of a plurality of lines including the nth line of said plurality of pictures commencing from a different preselected line in each of said plurality of pictures, the combination of:
- means for selecting the nth line from said plurality of lines commencing at a preselected line so that the lines are selected from one of said plurality of pictures;
- means for delaying said selected lines for substantially $n-1$ line time periods, said means for delaying having a predetermined bandpass characteristic;
- means for providing a subcarrier signal falling within the band of said bandpass characteristic;
- means for modulating said subcarrier signal with said selected lines prior to application to said means for delaying;
- means for demodulating the modulated signals after being delayed in said delay means;
- means for combining said selected lines which are undelayed with those which are delayed; and
- means for displaying said selected and combined lines so that an undelayed line is followed by a corresponding delayed line.

3. The combination of claim 2 wherein said plurality of n-separate pictures of color video pictures including luminance and chrominance components:
- said delay means includes
- a luminance delay channel including filter means for eliminating the color subcarrier from said color video pictures;
- a luminance delay line having a bandwidth less than said color video pictures and having a predetermined bandpass characteristic wherein said color subcarrier frequency falls within the band of said bandpass characteristic;
- means for providing a color subcarrier signal at the transmitted color subcarrier frequency;
- modulating means for modulating said subcarrier signal with said selected lines prior to application to said luminance delay line;
- means for demodulating the modulated signals after being delayed in said luminance delay line;
- said means for combining includes luminance combining means for combining the undelayed luminance and the delayed luminance signals;
- a chroma delay channel includes
- said means for delaying includes a chroma delay line having substantially the same bandwidth and bandpass characteristic as said luminance delay line;
- said means for combining includes
- chroma combining means for combining the delay chroma signals and the undelayed chroma signals.

4. In a system for transmitting and receiving a plurality of n-separate color video pictures including luminance and chrominance portions, the combination of:
- means for selecting every nth line of each of said plurality of color video pictures commencing at a different preselected line for each of said plurality of color video pictures;

means for transmitting the selected lines in the order selected of each of said plurality of color video pictures in the form of a plurality of lines;

means for selecting the nth line from said plurality of lines commencing at a preselected line so that the lines are selected from one of said plurality of color video pictures;

means for delaying said luminance and chrominance portions of said selected lines for substantially one line time period, said luminance portion being delayed by a medium having a bandwidth less than the bandwidth of said luminance portion;

means for combining said selected lines which are undelayed with those which are delayed; and means for displaying said selected and combined lines as said selected one of said plurality of color video pictures so that an undelayed line is followed by a delayed line.

5. In a system for receiving a plurality of n-separate color video pictures including luminance and chrominance portions in the form of a plurality of lines including the nth line of said plurality of pictures commencing from a different preselected line in each of said plurality of pictures, the combination of:

means for selecting the nth line from said plurality of lines commencing at a preselected line so that the lines are selected from one of said plurality of color video pictures, said color video pictures including luminance and chrominance portions;

means for delaying said luminance and chrominance portions of said selected lines by substantially $n-1$ line time periods, said luminance portion being delayed by a medium having a bandwidth less than the bandwidth of said luminance portion;

means for combining said selected lines which are undelayed with those which are delayed; and means for displaying said selected and combined lines so that an undelayed line is followed by a corresponding delayed line.

* * * * *